April 9, 1963  K. N. MOSELEY  3,084,787
WALKING BEAM CONVEYOR
Filed March 11, 1960  3 Sheets-Sheet 1
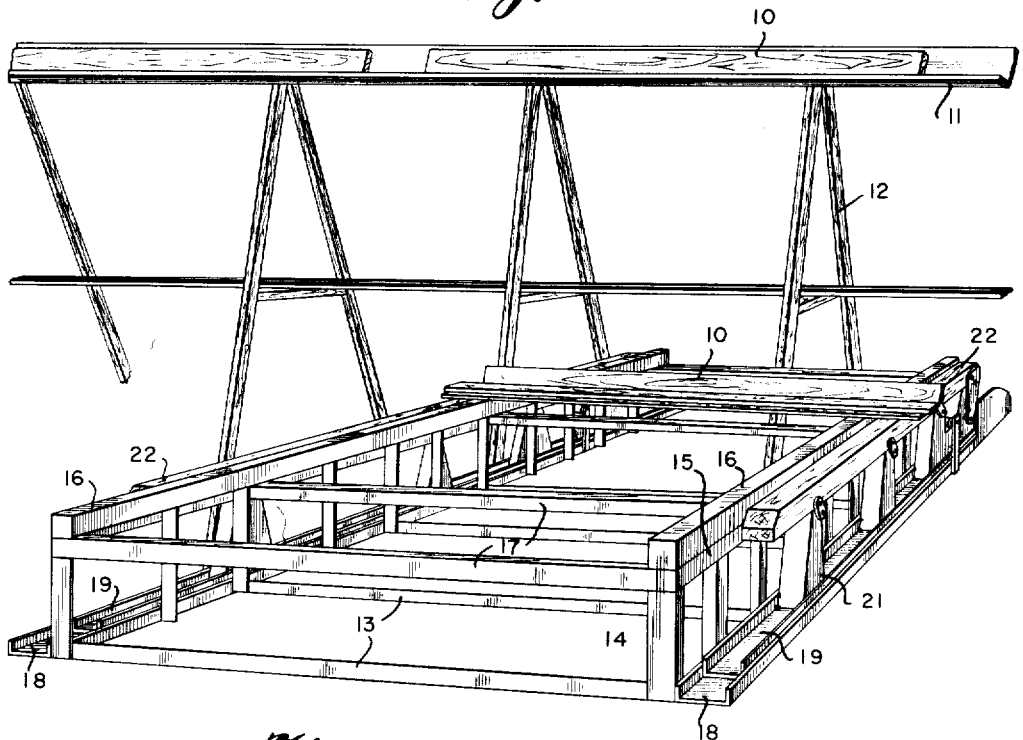
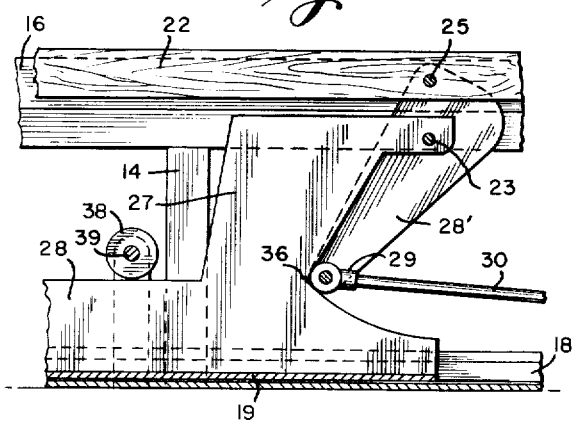
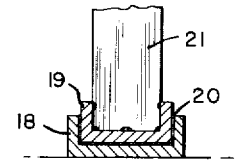
INVENTOR
Kemper N. Moseley
BY
ATTORNEY April 9, 1963 K. N. MOSELEY 3,084,787
WALKING BEAM CONVEYOR
Filed March 11, 1960 3 Sheets-Sheet 2
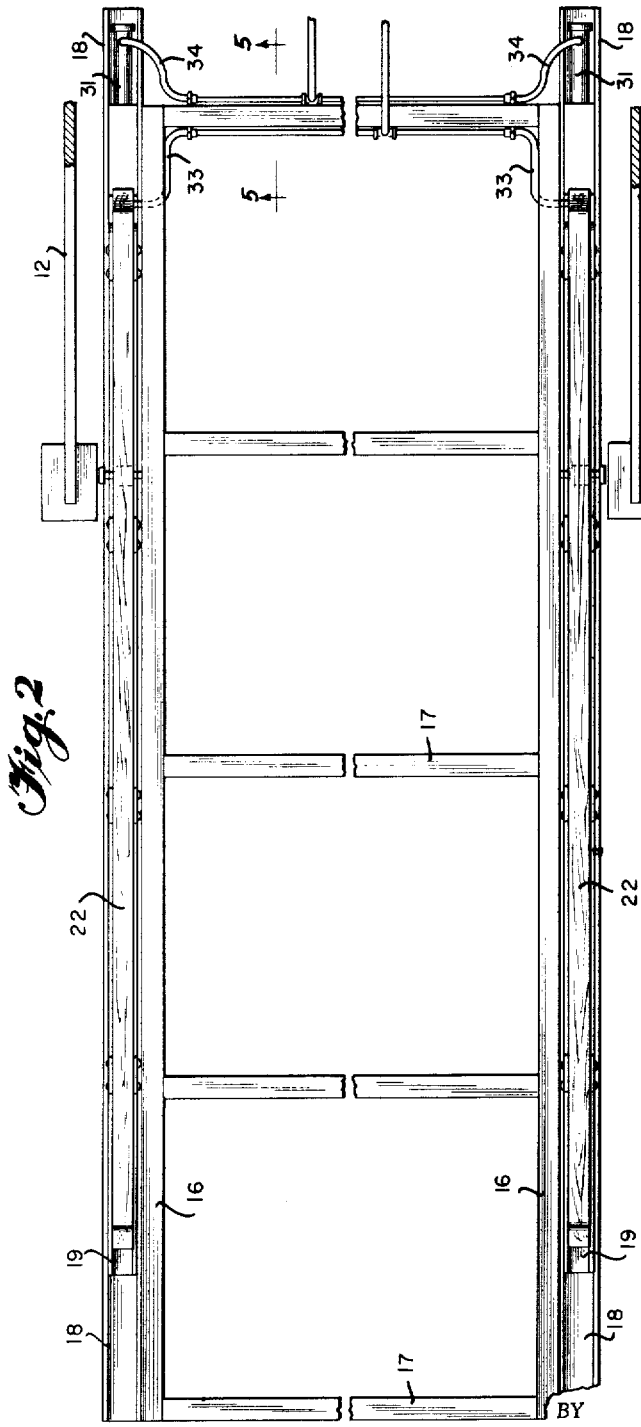
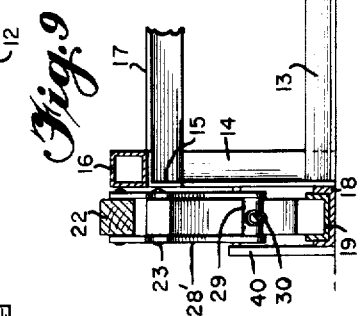
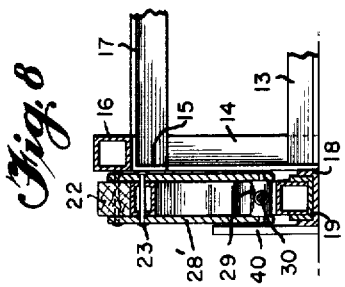
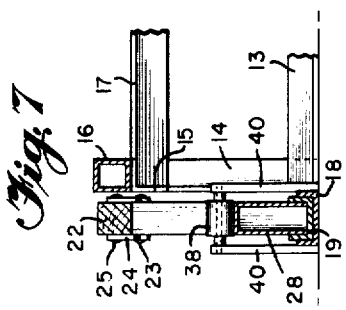
INVENTOR
*Kemper N. Moseley*
BY *Wyatt Dowell*
ATTORNEY April 9, 1963  K. N. MOSELEY  3,084,787
WALKING BEAM CONVEYOR
Filed March 11, 1960  3 Sheets-Sheet 3
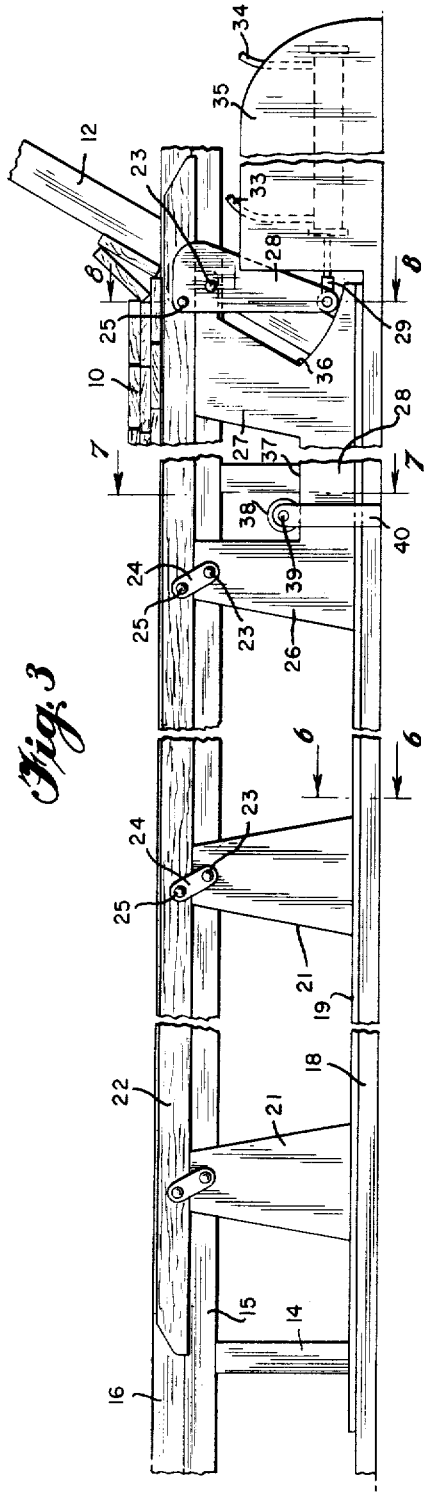
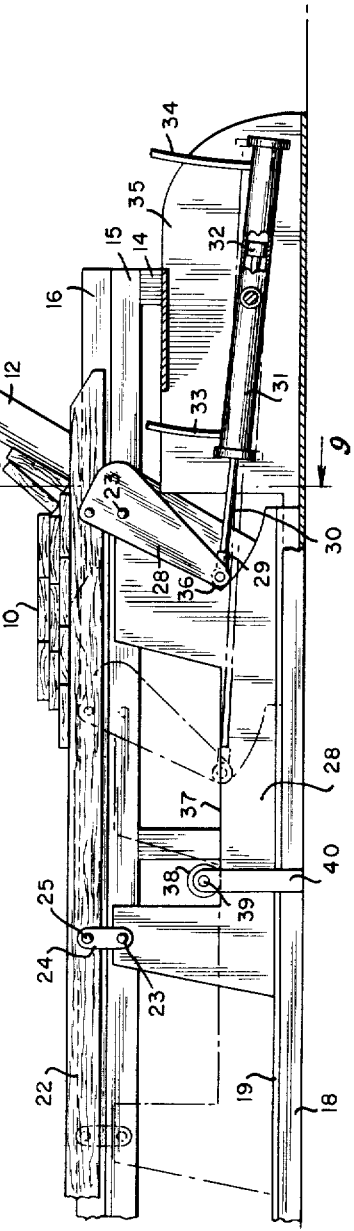
INVENTOR
Kemper N. Moseley
BY
ATTORNEY

United States Patent Office 3,084,787
Patented Apr. 9, 1963

3,084,787
WALKING BEAM CONVEYOR
Kemper N. Moseley, 1014 Gloria Ave., Durham, N.C.
Filed Mar. 11, 1960, Ser. No. 14,406
6 Claims. (Cl. 198—219)

This invention relates to the manufacture, sorting, and handling of lumber and to the equipment employed in the performance of such undertakings and which equipment is intended to save time, labor, and costs incident to the several operations involved.

The invention relates particularly to the moving, transferring, or conveying of lumber or other material which is relatively heavy from one place to another by mechanical means as, for example, from a location where it is deposited by a lumber sorter to a position remote from such sorter in order to allow the continued deposit of lumber in such location.

In the manufacture of lumber, logs of varying sizes and lengths are sawed into boards of different widths, thicknesses and lengths and these are sorted or moved mechanically along a path and discharged according to size with boards of like measurements being deposited at the same station. Continued accumulation of lumber at the same station would interrupt the operation, and accordingly it is necessary from time to time to remove each accumulation of lumber and this has required workmen and much time particularly where there has been a substantial quantity of lumber sorted and in numerous measurements.

It is an object of the invention to provide a conveyor for easily and efficiently handling lumber in small or large masses and which can be operated by a workman or can be made fully automatic and which is sturdy enough to withstand any heavy load to which it may be subjected.

Another object of the invention is to provide a simple, compact, sturdy base frame capable of holding or supporting a large accumulation of lumber or other material and with mechanism for elevating such lumber from such support and moving the same along the support.

Another object of the invention is to provide a conveyor for lumber which conveyor is designed to first elevate and then advance the lumber and including a walking beam conveyor, spaced parallel bars pivotally supported along their lengths by means of pivoted links with one of such links extended and operated by mechanical means such as an hydraulic cylinder which first swings the pivoted links to elevate the parallel bars and then moves the bars with the load thereon and thereafter lowers and retracts the bars.

Other objects and advantages of the invention will be apparent from the following description taken in conjunction with the accompanying drawings wherein:

FIG. 1 is a perspective illustrating the application of the invention to a lumber sorter;

FIG. 2, a top plan view of the walking beam conveyor;

FIG. 3, a side elevation with the walking beam conveyor in inoperative position;

FIG. 4, a similar view with the parts raised to support the load prior to the advancing of the load;

FIG. 5, a section on the line 5—5 of FIG. 2;

FIG. 6, an enlarged fragmentary vertical section on the line 6—6 of FIG. 3;

FIG. 7, a fragmentary detail vertical section on the line 7—7 of FIG. 3;

FIG. 8, a fragmentary detail vertical section on the line 8—8 of FIG. 3; and

FIG. 9, a vertical section on line 9—9 of FIG. 4.

Briefly stated, the invention is a walking beam conveyor in cooperative relation with a lumber sorter and comprises a generally rectangular frame of longitudinal and transverse structural elements fabricated in a manner to support a heavy load of lumber or other material and relative to which frame it is desired to support and move the load. Mounted on opposite sides of the frame and near the lower portions thereof are a pair of channels or slideways in each of which is received a slide having spaced supporting posts and a beam mounted thereon. The beam is connected to the post by pivoted links which cause the beam to raise and lower when it is moved relative to the posts on which it is mounted. The rearmost link of each slide has an extension so that it can be first swung to raise the beam to support the load carried by the adjacent frame and then the slides on which the beams are mounted are moved lengthwise of the channel to transfer the load to a position remote from the lumber sorter and subsequently lower the load to the frame and retract the slides to their initial positions.

With continued reference to the drawings, lengths of lumber 10 are moved along the trough 11 of a lumber sorter supported by A-frames 12 in any desired manner. The inclined sides of the lumber sorter cause the lumber to gravitate laterally from the sorter as the lumber is ejected therefrom. Lumber thus discharged at different stations along the length of the sorter reaches substantial proportions and may interrupt the operation of the lumber sorter and consequently it is necessary that the accumulated lumber be removed from the location at which it is deposited.

A walking beam conveyor is provided to move the lumber laterally to a position remote from the sorter. The conveyor comprises a stationary frame structure having a series of lower transverse members 13, uprights 14, side rails 15 and 16 and upper transverse members 17. The frame is of a sufficiently sturdy construction to support a heavy load of lumber or other material on the side rails 16.

In order to transfer the accumulated lumber carried by the stationary frame, an upwardly opening slideway forming channel member 18 provides a track or guideway and is welded or otherwise attached to the posts 14 on each side of the frame and serve as a brace for such posts. Within each of the channels 18 is a slide 19 which if desired also may be channel shaped. The slides 19 are adapted to be readily movable endwise within the channels 18 and for this purpose a suitable heavy lubricant 20 is employed between the slide and the channel. Along the length of each slide 19 is mounted a series of posts 21 which may be welded or otherwise secured in place and such posts are adapted to support a beam 22. The upper portion of each post 21 is connected by a pivot 23 to a link 24 and the opposite end of the link is connected by a pivot 25 to the beam 22. When the beam 22 is resting on the upper ends of the posts 21, the upper surface of such beam is below the upper surface of the side rail 16 as clearly illustrated in FIG. 3. When the beam 22 is moved to the right as illustrated in FIG. 4, the links are in substantially vertical position and due to the distance between the pivots 23 and 25 the beam 22 will be raised so that its upper surface will be slightly above the upper surface of the side rails 16.

In order to raise and lower the beam 22 to engage lumber or other material extending across and beyond the side rails and to elevate the load above such rails, the rearmost portion of each slide has posts 26 and 27 connected by a reduced portion 28. The upper portion of post 26 is connected by a pivot 23 to a link 24 and the opposite end of the link is connected by a pivot 25 to the beam 22. A camming member 28' is supported on the post 27 by a pivot 23 and is connected to the beam 22 by a pivot 25.

The lower portion of the camming member 28' extends downwardly and is connected to the end 29 of a piston rod 30. Such piston rod extends into an hydraulic cylinder 31 to a piston 32 and is moved in and out of such cylinder by fluid applied through hydraulic conduits 33 and 34. The hydraulic cylinder is pivotally mounted within a casing 35 and when pressure is applied through conduit 34, piston rod 30 oscillates the camming member 28' about its pivot 23 until such camming member contacts a stop or motion limiting means 36 on the post 27. In this position the pivots 23 and 25 are substantially in vertical alignment and the beam 22 is raised to support the load. Subsequent outward movement of the piston 32 and piston rod 30 will move the slide along the channel 18. When the piston is retracted, the camming member 28' will first lower the beam 22 and deposit the load on the stationary frame and then retract the slide to its initial position.

The reduced portion 28 has a top 37 on which a restraining roller 38 is mounted. Roller 38 is rotatably supported by a shaft 39 carried by a pair of spaced uprights 40 fixed to the channel 18.

In order to make certain that the beams 22 on opposite sides of the stationary frame operate simultaneously, the hydraulic cylinders 31 are supplied with fluid from a common source. In the event that one cylinder moves prior to the other, when the beam raises sufficiently to encounter the load the added weight will avert the fluid to the other hydraulic cylinder until such time as it encounters an equal weight whereupon both cylinders will operate simultaneously to lift the load and to transfer such load along the length of the frame.

In the operation of the device, lumber or other heavy material is deposited onto a stationary frame from a lumber sorter. When it is desired to move the accumulation of lumber from a position adjacent to the lumber sorter the hydraulic cylinders are operated to first raise the beams 22 to support the lumber and then subsequent operation of the hydraulic cylinders will move the slides 19 along the length of the channel 18 until the cylinders reach the end of their stroke. When the cylinders are retracted, the beams 22 are lowered and the load is deposited on the frame whereupon the slides are retracted to their initial position. If desired, the operation may be repeated until the lumber reaches the end of the beam 22 or it may remain in the position where it was left after the first step and will be shifted to a second position when the next succeeding accumulation of lumber is moved from the position adjacent to the sorter.

It will thus be evident that applicant has provided a single unitary operating means in the form of a hydraulic piston and cylinder to perform the function of raising a load from a stationary supporting frame and then advancing such load in the direction of movement of the projecting piston rod. The reverse reciprocation of the piston rod then first lowers the load supporting beam and thereafter moves the slide with the load supporting beam in the direction opposite the direction of feed whereby the complicated cam structure and complicated lifting mechanism are avoided while obtaining the desired feeding action in a very simple and relatively inexpensive structure.

It will be apparent that a simple, inexpensive walking beam conveyor is provided for intermittently moving an accumulation of material from one position to another. If desired, the hydraulic cylinders may be operated continuously to move the lumber or other material along the length of the stationary frame and to prevent a large accumulation at one point.

It will be obvious to those skilled in the art that various changes may be made in the invention without departing from the spirit and scope thereof and therefore the invention is not limited by that which is illusttrated in the drawing and described in the specification, but only as indicated in the accompanying claims.

What is claimed is:

1. A walking beam conveyor comprising a frame, channels forming slideways at opposite sides of said frame, a slide in each of said channels, a plurality of posts mounted on each of said slides, a beam mounted on said posts of each slide, pivots and links mounting said beams on said posts so that when the beam is moved endwise on said posts it will be raised and lowered, one of said links being extended, unitary operating means for swinging the end of said extended link to raise said beams, and means limiting the movement of said link relative to said slides so that after said beams are raised the continued motion of said operating means causes said slides to move with the beams in raised position carrying the load.

2. A walking beam conveyor comprising an article supporting frame, a beam, supporting structure for said beam, said supporting structure mounted on a slide, pivoted links connecting said supporting structure and said beam for raising and lowering said beam relative to said frame by the swinging of such links, and unitary means operatively associated with said one of said links for first swinging the link, and motion limiting means operatively associated with said unitary means, for then preventing further relative movement of said links and beam relative to said slide so that further movement of said unitary means moves the supporting structure, slide and beam in a feeding direction.

3. An article conveyor comprising spaced parallel slideway forming means, a load supporting frame between said slideway forming means, load lifting and moving means operatively associated with said slideway forming means comprising slides movable in said slideway forming means, beams supported by said slides, and including pivoted links mounting said beams, and unitary means operatively associated with said links and said slides for first swinging said links to elevate said beams and means limiting the movement of said link relative to said slides so that after said beams are raised the continued motion of said unitary means causes said slides to move with the beams in raised position carrying the load thereon.

4. The combination of a frame for supporting heavy material, movable means associated with said frame for engaging material thereon and for raising the material from said frame, said movable means comprising supporting mechanism, slide means, and multiple links pivotally mounting said support mechanism on said slide means, and means operatively connected with said links for causing swinging of the links to raise the supporting mechanism, stop means in operative relation to one of said links so that further movement of said means for swinging the links advances the links, slide and supporting mechanism.

5. A walking beam conveyer comprising a stationary frame having load supporting opposite edges arranged in spaced relation, a slideway positioned adjacent each of said opposite edges of said stationary frame, a slide mounted on each slideway for longitudinal movement in the direction of said load supporting opposite edges, a load supporting beam positioned above each slide, cooperating connecting means between each slide and its cooperating beam causing limited vertical movement of the beam relative to the slide so that the load supporting surface of the beam will be raised above the plane of the load supporting opposite edges of the stationary frame and will be movable below the plane of said opposite edges of the stationary frame, drive means operatively connected to at least one of the cooperating connecting means, motion limiting means to limit the vertical movement of the beam, movement of said drive means causing the beam to be first raised above the plane of the said opposite edges of said stationary frame until the beam operatively engages the load and further movement of said drive means causing said slide to move with said beam thereby translating the load in the feeding direction of movement of the beam, said drive means being movable in the opposite direction first lowering the beam below the plane of the load supporting opposite edges and further movement in said opposite direction causing said slide to be moved in a direction opposite the direction of the feeding movement whereby a step by step feed can be accomplished from a single drive means.

6. A walking beam conveyor comprising an elongated stationary frame, a guideway extending along and positioned adjacent said stationary frame, a slide mounted for movement in said guideway, a walking beam positioned above said slide, a plurality of links extending between said slide and walking beam, each link being pivotally connected at spaced points to the walking beam and to said slide, at least one of said links having an extension beyond a pivotal connection point, power means connected to the free end of said extension, motion limiting means between said power means and said slide to limit the pivotal movement of said links whereby upon motion of said power means in one direction said beam will be raised from said slide raising a load from said stationary frame and while said beam is in raised position said motion limiting means will maintain said beam in raised position while further motion of said power means in said one direction will cause said slide with said raised beam to move along said guideway thereby carrying a load from said stationary frame in the direction of movement of said power means.

References Cited in the file of this patent
UNITED STATES PATENTS

| | | |
|---|---|---|
| 1,883,763 | Cochran | Oct. 18, 1932 |
| 3,003,615 | Ruppe | Oct. 10, 1961 |